United States Patent [19]

Johnson

[11] Patent Number: 4,703,022
[45] Date of Patent: Oct. 27, 1987

[54] ALUMINA AND MGO PREHEATABLE INSULATING REFRACTORY LINERS AND METHODS OF USE THEREOF

[75] Inventor: Howard B. Johnson, Cincinnati, Ohio

[73] Assignee: Consolidated Ceramic Products, Inc., Blanchester, Ohio

[21] Appl. No.: 666,510

[22] Filed: Oct. 30, 1984

[51] Int. Cl.$^4$ .................. C04B 35/04; C04B 35/10
[52] U.S. Cl. ............................ 501/95; 501/119; 501/109; 501/120; 266/280; 266/284; 523/139; 523/141
[58] Field of Search .............. 523/139, 140, 141; 501/95; 266/80

[56] References Cited

U.S. PATENT DOCUMENTS

| | | | |
|---|---|---|---|
| 3,514,302 | 5/1970 | Willmore et al. | 106/57 |
| 3,578,473 | 5/1971 | Alper et al. | 106/58 |
| 3,917,110 | 11/1975 | Kiguchi | 222/1 |
| 3,993,620 | 11/1976 | Yamanishi et al. | 523/139 |
| 4,387,173 | 6/1983 | Henry et al. | 523/139 |

FOREIGN PATENT DOCUMENTS 7005048  10/1971  Netherlands .................... 523/140

OTHER PUBLICATIONS

Harbison-Walker Refractories, "H-W Handbook of Refractory Practice", Second Edition, pp. 47-65.

*Primary Examiner*—Carman J. Seccuro
*Attorney, Agent, or Firm*—Wood, Herron & Evans

[57] ABSTRACT

Novel preheatable molded refractory insulating liners and methods of use thereof for lining metallurgical vessels, such as hot tops, ladels, tundishes, troughs and pipes, etc., which serve to transfer molten metals, such as ferrous alloys, are disclosed. The new and vastly improved preheatable liners are suitable for developing effectively the required hot strength needed for casting molten metals at vessel preheat temperatures and casting temperatures. The unique preheatable liners additionally possess the needed hot strength during the range of casting temperatures as are experienced in the metal making industry. The preheatable molded refractory insulating liners comprise a liner structure of predetermined shape, the liner structure comprising a molded uniform mixture containing a particulate refractory component comprised of alumina and MgO refractory grain and a binder therefore wherein the alumina and MgO refractory grain are in amounts proportioned such that the hot strength is developed at vessel preheat and metal casting temperatures which are in the range of about 1900° F. to about 3000° C. when such liners are heated for sufficient periods of time.

21 Claims, No Drawings

ALUMINA AND MGO PREHEATABLE INSULATING REFRACTORY LINERS AND METHODS OF USE THEREOF

BACKGROUND OF THE INVENTION

In the metal casting industry, it is customary to employ metal casting vessels, such as tundishes and ladles, etc., as means which serve to transfer various molten metals. Because of the corrosive nature of the liquid metals and the slags, and to prevent heat loss and premature solidification of the metals, the metal casting vessels are prevented from contacting with such metals and/or slags by lining the vessels with heat-insulating refractory boards. Additionally, a trend in the industry is to preheat these lined vessels to minimize heat loss from the initial molten metals poured through the vessels at the start of casting, and to remove, if possible, all sources of hydrogen derived from, for instance, moisture ($H_2O$) and/or organic compounds embodied in the refractory linings, which can be dissolved by and incorporated into the liquid metals passing through the lined vessels. In particular, when low hydrogen grades of steel are being cast, it is especially desirable to preheat such refractory lined vessels to remove all possible hydrogen sources which can serve only to contaminate the liquid metals.

In addition to driving off all sources of hydrogen, it is desirable to minimize the amount of unstable oxides, such as silica, which are present in the heat-insulating refractory boards. These unstable oxides, and in particular silica, can react with various elements contained in the molten metals and lead to the formation of oxide inclusions in the liquid metals. For example, some of the undesirable reactions of silica with various elements leading to the formation of oxide impurities are as follows:

$$SiO_2 + [2Mn] \rightleftharpoons 2MnO + [Si]$$

$$3SiO_2 + [4Al] \rightleftharpoons 2Al_2O_3 + [Si]$$

$$SiO_2 + [2Fe] \rightleftharpoons 2FeO + [Si]$$

The MnO and FeO formed can further attack the silica in the heat-insulating refractory linings by forming low melting liquid oxide slags at metal casting temperatures.

Unfortunately, the dilemma facing the metal-making industry concerning the addition of unstable oxides which act to lower sintering and solidus temperatures versus the use of pure, stable refractory oxides for refractoriness and molten metal purity is extremely difficult to overcome, especially with preheatable heat-insulating refractory boards which must sinter and develop sufficient hot strength for casting at sub-casting temperatures which can be sometimes as much as about 1,000° F. lower than casting temperatures.

Another problem presently associated with the heat-insulating refractory linings for the metal casting vessels involves shrinkage of such linings upon heating. One solution within the metal-making industry to this problem is to fire such linings at temperatures higher than those that are expected during use, so that shrinkage during use can be avoided. Again, since preheating can occur at temperatures as low as about 1000° F. below casting, this presents a further problem with the current preheatable boards.

In the case of cold tundish practice, i.e., the pouring of a molten metal into a tundish without first preheating it, the temperature increases as the molten metal enters the tundish and decomposes the organic binder under reducing conditions forming carbon bonds. The carbon bonds hold the refractory together giving the tundish lining the required hot strength. As the carbon bonds are dissolved by the molten metal and oxidized, sintering of the refractory grain occurs over time. Thus, in cold tundish practice, the organic binder decomposition gives carbon bonds allowing the use of more stable refractory oxides which sinter more slowly and at higher temperatures, i.e., MgO with silica.

Nevertheless, in casting, the temperature associated with cold tundish linings increases quickly to that of casting such that by the time carbon bonds are completely disintegrated, the linings are still held together by the formation of ceramic bonds resulting from the sintering of the refractory oxides. Because preheating may sometimes last up to, for example, 12 hours before casting actually begins, the linings utilized in cold tundish practice are unsuited for preheating use. The problem basically is due to oxidation of the carbon bonds within the linings at preheat temperatures which are generally too low for ceramic bonds to form resulting in usually soft and weak linings which will collapse due to their own weight or wash away as the molten metal enters the vessels.

In the past, several attempts or approaches without success have been made to overcome the problems presently associated with preheatable heat-insulating refractory boards for metal casting vessels. For example, large amounts of low-melting glass formers, such as borax, have been incorporated into the linings in an effort to stick the refractory grain together at preheat temperatures. Unfortunately, the glassy or liquid bonds allow the preheated linings to be deformed easily at preheat and casting temperatures after the carbon bonds burn out. Further, the preheated linings generally fail to develop the requisite hot strength for casting when preheated at preheat temperatures for extended periods of time prior to the start of casting. As a result, it has generally been found that at both preheat and casting temperatures, the liners would collapse or wash away.

An additional problem associated with the use of low-melting glass formers is that they are generally thermodynamically unstable to, for instance, ferrous alloys. In the case of $B_2O_3$, it can be reduced resulting in the incorporation of boron into the molten metals, such as ferrous alloys, that can alter the properties of the ferrous alloys as well as produce oxide inclusions.

Other types of preheatable linings are those made with the addition of about 5% to about 20% quartz (silica) for the purpose of bonding with MgO. Unfortunately, these preheatable boards have two serious drawbacks. First, the amount of quartz or other silica forms utilized by these liners is sufficiently high enough to cause the formation of oxide inclusions by reaction of the molten metals with the linings. In order to minimize liquid metal contamination, the metal manufacturers specify that the quartz or free silica levels should be as low as possible. Secondly, presence of finely divided crystallized quartz or free crystalline silica can become airborne when, for instance, the boards are removed from the vessels after use presenting health hazards to the metal manufacturers and workers.

Examples of still other types of preheatable linings are those which contain about 85%–90% magnesite and about 5% to about 10% calcium flouride. The calcium flouride is typical of a strong fluxing agent which reacts with oxides to develop a liquid bonding phase at preheat temperatures. These linings, like those utilizing the low-melting glass formers, develop a liquid bonding phase when the organic binder is burnt out at, for instance, 1900° F. and up (preheat temperatures). The linings, unfortunately, are also very soft and weak at such temperatures after the organic binder is oxidized. Thus, as with the preheatable linings containing low melting glass formers, the preheatable linings fail to develop the sufficient hot strength for casting when heated at preheat temperatures for typical preheat periods of time.

In summary, previous attempts or approaches have been made to develop suitable preheatable insulating refractory liners. Heretofore no satisfactory preheatable heat-insulating refractory liner has been developed which can overcome the problems aforementioned. Basically, the past preheatable liners fall into two categories: those in which quartz is added in unacceptable amounts to form a ceramic bond; and those in which low melting materials are added to develop a liquid phase at preheat temperatures as an unsatisfactory attempt to protect the carbon bonds from oxidation and to bond the refractory grain and promote sintering.

In other words, all of the preheatable heat-insulating refractory liners provided hitherto invariably necessarily lack some of the key fundamental qualities required to develop sufficient hot strength at preheatable or sub-casting temperatures for the typical range in which preheating times occur. Consequently, there are strong commercial needs for preheatable heat-insulating refractory liners for metal casting vessels that can initiate the development of hot strength at preheat temperatures, that can withstand preheat temperatures for extended periods of preheat time, that can withstand molten metal erosion and corrosion, that will not experience substantial shrinkage on use, and that has minimum amounts of free silica and hydrogen content.

SUMMARY OF THE INVENTION

In brief, the present invention seeks to alleviate the above-mentioned problems and shortcomings of the present state of the art through the discovery of novel preheatable molded refractory insulating liners and methods of use thereof for lining metal casting vessels intended to contain, for instance, ferrous alloys, such as steel, and in particular, low hydrogen grades of steel. In a preferred embodiment, the present invention is directed to a preheatable molded refractory insulating liner for a casting vessel suitable for developing sufficient hot strength at vessel preheat and metal casting temperatures which are in the range of about 1900° F. to about 3000° F. comprising a liner structure of predetermined shape, the liner structure comprising a molded uniform mixture containing a particulate refractory component comprised of alumina and MgO refractory grain and a binder for the component to maintain the predetermined shape at least prior to the preheat temperatures wherein the alumina and MgO refractory grain are in amounts proportioned in the liner structure to facilitate the formation of spinel bonding which results in increased hot strength at the vessel preheat and metal casting temperatures when such a liner structure is heated for a sufficient period of time. Typically, in the industry preheat time can be from about one-half hour and extend to about twelve hours or more. Preferably, the particulate refractory component comprises about 75% to about 98.5% by weight of the liner a grain mixture of alumina and MgO refractory grain being in a ratio from about 1:1 to about 1:94, respectively. The MgO refractory grain may be derived from, for instance, natural, seawater or brine magnesite, periclase grain, or other suitable sources, or mixtures thereof plus, if any, incidental impurities. The alumnia may be derived from various sources such as corundum, bauxite, emery, gibbsite, alumina hydrate or diaspore to name a few. The MgO refractory grain and the alumina are the main essential constituents responsible for the development of the hot strength at the vessel preheat and metal casting temperatures. At such temperatures, it is believed that the MgO refractory grain and alumina react as follows to form the spinel bonds needed for hot strength and refractoriness:

It is thought that the formulation of spinel enhances the desirable hot strength and corrosion resistance to the molten metals, such as ferrous alloys, and slag. It should be appreciated, however, that the formation of spinel is believed to occur over the entire range of vessel preheat and casting temperatures which are on the order of about 1900° F. to about 3000° F. The vessel preheat temperatures, for instance, can range from, for example, about 1900° F. to about 2400° F. whereas, in the case of ferrous alloys, the metal casting temperatures are generally at about 2800° F. or above.

In a further feature of this invention, the particulate refractory component may contain in addition to the alumina and MgO refractory grain a suitable refractory filler in acceptable amounts, such as spinel, zirconia or alumina.

Therefore, the new and vastly improved preheatable liner structures provide means for developing effectively the necessary increased hot strength needed for casting molten metals at both vessel preheat temperatures and metal casting temperatures. Further, the unique preheatable liners possess the necessary hot strength during the range of casting temperatures that are experienced in the metal making industry and especially the ferrous alloy making industries. In effect, a feature of the present invention is to provide preheatable molded refractory insulating liners that possess corrosionerosion resistance to metal making environments which is greatly superior to that of the common commercial preheatable refractories used heretofore. Thus, the present invention provides a solution to the art that has long sought suitable liners for preheating and makes it now possible to preheat casting vessels lined with the preheatable refractory insulating liners of this invention for extended periods of time prior to the start of casting.

To improve the quality of the molten metals including ferrous alloys, and especially low hydrogen grades of steel, during casting, the heat-insulating refractories employed to line the casting vessels which come into contact with the molten metals should be composed of the most stable oxides possible (i.e., the stronger the chemical bonding of the oxides, the higher the melting point). Unfortunately, this means that temperatures greater than preheatable temperatures which are generally from about 1900° F. to about 2400° F. are required to sinter the refractory grain of the stable oxides present in the linings. Thusly, a balance or compromise has to be struck between the refractory stable oxides and impurities utilized in the present heat-insulating refractory boards. The refractory stable oxides must have enough impurities, but without sacrificing quality of the casting metals, to develop a dense sinter surface at temperatures of about 2800° F. or higher. The types and amounts of unstable impurities which act to lower temperatures needed for sintering and solidus, however, must be controlled to maintain the needed heat-insulating refractory lining requirements and to minimize the contamination of the casting metals by the unstable oxides. The present invention, however, has remarkably overcome this arduous dilemma by providing a unique blend of stable and unstable oxides which is suitable for developing refractoriness and hot strength at vessel preheat and metal casting temperatures while developing a dense sinter at about 2800° F. without significantly contaminating the molten metals, such as ferrous alloys, with impurities during casting.

In a further feature of the present invention, the binder component may be derived from organic and/or inorganic binders or mixtures thereof in the range from about 1.5% to about 15% by weight. The inorganic binder may, for instance, constitute low melting fluxing compounds, such as boric acid. Additionally, the preheatable liners may contain a fibrous material component which may also be derived from organic and/or inorganic materials in the range from about 0% to about 10% by weight. In keeping with the invention, the preheatable liners may further contain a thixotropic substance, such as bentonite, in amounts ranging from 0% to about 5% by weight.

In still a further feature of the present invention resides in providing preheatable molded refractory insulating liner structures suitable for lining casting vessels like hot tops, ladles, tundishes, troughs, or pipes, etc., for conveying molten ferrous alloys. The preheatable liners, if desired, can be molded into the form of a plurality of predetermined shaped inserts, such as tundish boards.

An especially desirable corrosion-erosion resistant preheatable molded refractory insulating liner according to this invention comprises by weight about 80% to about 95% a particulate refractory component containing MgO refractory grain and alumina wherein the MgO refractory grain and alumina are in a ratio of about 5:1 to about 18:1, respectively, about 1% to about 8% fibrous material, about 1.5% to about 10% binder, and about 0.5% to about 5% a thixotropic substance. As noted above, the MgO refractory grain may be derived from, for instance, natural, seawater or brine magnesite, periclase grain, or other suitable sources, or mixtures thereof whereas the alumina may be obtained from, for example, corundum, bauxite, emery, diaspore, gibbsite, or alumina hydrate, etc. The lower silica and hydrogen content of the preheatable structures provide a further feature for reasons recited above; that is, the cast molten metals and particularly the ferrous alloys are distinctly purer as a result of less contamination presently experienced from high silica and hydrogen content associated with the common preheatable refractories available hitherto.

A preferred form of the present invention possessing the high degree of hot strength developed at vessel preheat and metal casting temperatures comprises by weight about 10% alumina, about 80% MgO refractory grain plus incidental impurities, wherein the MgO is derived from dead burned natural, seawater or brine magnesite, periclase grain or mixtures thereof which may range from about 80% to about 98% MgO purity, the balance being binder, and if desired fibrous material or bentonite or mixtures thereof. Keeping the silica and hydrogen contents low in this preferred form, the same as aforesaid, will also provide distinctly purer cast molten metals.

Other incidental impurities are merely those of extremely minor contaminants which result from the ordinary impurity contents normally associated with different grades of raw material sources for MgO, alumina, etc. The total amount of impurities should be kept to a minimum, if possible, to reduce or avoid possible detrimental effects to the above-noted properties and structural characteristics.

In still another feature of the present invention is directed to a method of casting using a casting vessel comprising the steps of providing within the vessel a preheatable molded refractory insulating liner of this invention, heating the vessel to at least a vessel preheat temperature to initiate the development of hot strength in the preheatable liner for casting at metal casting temperatures, and introducing a molten metal, such as a ferrous alloy, into the vessel.

Thusly, it can be appreciated that the special features and unique advantages of the preheatable molded refractory insulating liners of this invention makes the same highly effective refractory liners suitable for preheating for extended periods of time prior to the start of molten metal casting.

The above and other features and advantages of the invention, including various novel details of construction and composition, will now be more particularly described with reference in the detailed description and pointed out in the claims. It will be understood that a composition for a preheatable molded refractory insulating liner embodying the invention is shown in the example by way of illustration only and not as a limitation of the invention. The principles and features of this invention may be employed in various and numerous embodiments without departing from the scope of the invention.

DETAILED DESCRIPTION OF THE INVENTION

By way of illustrating and providing a better appreciation of the present invention, the following detailed description and example are given concerning the preheatable molded refractory insulating structures of the invention and their properties or characteristics.

In accordance with the present invention, it is directed to providing a preheatable molded refractory insulating liner for lining a casting vessel suitable for developing sufficient hot strength at vessel preheat and metal casting temperatures which are on the order of about 1900° F. to about 3000° F. when such a liner is heated for a sufficient period of time. This is accomplished in the present instance by means of a preheatable molded refractory insulating liner comprising a liner structure of predetermined shape, the liner structure comprising a uniform molded mixture containing a particulate refractory component comprised of alumina and MgO refractory grain and a binder therefore. In addition, the preheatable liner preferably contains a fibrous material and, if desired, minor amounts of bentonite or other suitable thixotropic substances.

In the specification, the term "hot strength" refers to a liner having sufficient hot strength to support itself during extended preheating and to withstand erosion resulting from a molten metal entering a vessel during casting. In other words, the preheatable liners made and used in accordance with the teachings of this invention unexpectedly and advantageously generally do not soften or weaken, collapse or wash away after being preheated by a molten metal entering the vessel, as currently experienced with other prior art preheatable liners. Additionally, the preheatable liners of the present invention are less prone to contaminate the molten metals because of their low free silica and low hydrogen contents.

In a preferred embodiment, the preheatable molded refractory insulating liners are formed of by weight of about 75% to about 98.5% particulate refractory component comprised of alumina and MgO refractory grain being in a ratio from about 1:1 to about 1:94, respectively, and about 1.5% to about 15% binder, 0% to about 10% fibrous material and 0% to about 5% a thixotropic substance. Preferably, the alumina is about 5% to about 15%, and most preferably about 10% by weight of the liner. The alumina, also known as aluminum oxide ($Al_2O_3$), and sometimes known as corundum, bauxite, emery, diaspore, etc., can be derived from natural or synthetic products, or any other suitable sources, like gibbsite and alumina hydrate, not inconsistent with the teachings of this invention. For instance, it is found that alpha alumina such as tabular, calcined and fused alumina are suitable sources of alumina. It has been surprisingly discovered that when alumina, and especially finely comminuted alumina, or aluminum oxide, is intimately mixed with MgO refractory grain in sufficient amounts and made into a molded refractory insulating liner for a casting vessel, the alumina and MgO refractory grain unexpectedly react at vessel preheat temperatures which are in the range of about 1900° F. to about 2400° F. to develop sufficient hot strength as a result of the formation of spinel bonding when such a liner is heated for a sufficient period of time. To this end, it is not necessary, but highly preferable, that the entire amount of alumina, or aluminum oxide, used be very finely comminuted. For example, preferably about 95% of the alumina particles should pass through a 325 mesh screen, and more preferably substantially all should pass through a 400 mesh screen. Most preferably, the alumina should have an average particle size of about 10 microns. In particular, ground alumina is especially suitable as a source for highly comminuted alumina to be employed pursuant to the invention. The term alumina employed herein is to be understood in each instance as referring to a chemical combination of aluminum and oxygen designatable by the formula $Al_2O_3$ and irrespective of its origin be it synthetic or natural.

In carrying out the invention, the MgO refractory grain, also known as magnesium oxide or magnesia, can be derived from any suitable sources and especially from inert sources, such as natural, seawater or brine magnesite, periclase grain, or any other suitable source, or mixtures thereof. The magnesite or periclase grain, however, preferably is of the type commonly referred to as dead burned magnesite or dead burned periclase. By "dead burned" magnesite or periclase is meant magnesite or periclase fired to high temperatures to produce a hydration resistant grain consisting essentially of well-sintered low porosity periclase crystals and this grain structure distinguishes it from the more reactive lower temperature calcined caustic magnesites. Nevertheless, it should be understood that it is preferred that the MgO refractory grain content, whether derived from natural, seawater or brine magnesite, periclase grain, or other suitable sources should be substantially pure. By "substantially pure", it means containing at least about 80% MgO by weight on the basis of an oxide analysis, with the remainder, if any, being only minor amounts of incidental impurities. Generally, the best results are achieved when the particle size distribution of the MgO refractory grain is not too coarse or too fine. Preferably, such particles should be sized so that no more than about 40% are retained on a 50 mesh screen and no more than about 40% can pass through a 325 mesh screen. More preferably, no more than about 15% of the MgO refractory grain particles should be retained in a 50 mesh screen and no more than about 30% should pass through a 325 mesh screen.

Further, sources of MgO refractory grain should be selected on the basis of their low tendency to hydrate due to their high sintering temperatures and as a result of their composition.

In a most preferred form of the present invention, the preheatable molded refractory insulating liners comprises by weight about 10% alumina, about 80% of about a 95% MgO magnesite wherein the alumina and MgO refractory grain are in a ratio of about 1:8, respectively, about 1.5% to about 15% binder, 0% to about 10% fibrous material, and 0% to about 5% a thixotropic substance.

In another feature of the present invention, a suitable refractory filler may be added in acceptable amounts to the particulate refractory component which comprises alumina and MgO refractory grain. Exemplary of such fillers are spinel, zirconia and alumina wherein the fillers may be by weight of the liner as follows: spinel 0% up to about 70%; zirconia 0% up to about 80%; and alumina 0% up to about 80%. When the refractory filler is added to the particulate refractory component, however, it should be understood that such a mixture will still be by weight of the preheatable liner from abut 75% up to about 98.5% as aforementioned. It should further be understood that the alumina and MgO refractory grain are in the stated ratios not inconsistent with the teachings of this invention so that sufficient hot strength is developed in the preheatable liners at vessel preheat and metal casting temperatures. When alumina is used as a filler, it should further be understood that the filler alumina is not to be included in the alumina-MgO refractory grain ratios discussed herein. It should additionally be understood that the refractory fillers preferably should have a particle size approximating the size distribution of the MgO refractory grain. The advantages to adding a refractory filler to the particulate refractory component include, for instance, a reduction in manufacturing cost or to improve the corrosion resistance of the liner. An example of a preheatable refractory liner containing zirconia as a refractory filler has a composition comprising by weight zirconia about 64%, alumina about 4%, MgO refractory grain about 23%, binder about 1.5% to about 15%, fibrous material 0% to about 10% and a thixotropic substance 0% to about 5%. It can be noted that in this exemplary composition the MgO refractory grain and alumina ratio is about 6:1, respecitvely.

In carrying out the invention, the binder component may be derived from any suitable binder or mixtures of binders of those known in the refractory making and allied industries including organic and/or inorganic binders. Typically, vessel preheating is conducted at about 1900° F. to about 2400° F. and more typically between about 2000° F. and 2300° F. These preheat conditions cause the organic binders incorporated within the liners to burn out, for instance, starting at the hot face and sometimes throughout the entire board thickness, of course, depending upon preheat time, temperature and board thickness. Nonetheless, up until the point of burnout, the organic binders serve to hold or bind the other materials together and comprises by weight of the liner from about 1.0% to about 10%. Samples of organic binders suitable to be employed in the liners of the present invention include, but not limited to, starches, cereals, natural or synthetic resins, such as amino resins, phenolic resins or mixtures thereof. More particularly, the phenol-formaldehyde and ureaformaldehyde resins are best suited for use and most preferably is the phenol-formaldehyde resin. It should be appreciated that when the phenolformaldehyde resin is employed, a catalyst such as hexamethylenetetraamine, also known as HMTA, Hexa, methenamine, hexamine, aminoform, etc., should be added in sufficient amounts to polymerize the phenolformaldehyde resin to bond the refractory grains for making a rigid structure suitable for use as a liner.

In addition to providing binding support prior to the burnout of organic binder, the inorganic binder generally serves to stick or hold the particulate refractory component together during preheat conditions particularly after the organic binder has been consumed or burnt out. To this end, it is believed that the inorganic binder forms a glassy or viscous phase under preheat conditions developing characteristics suitable for sticking or binding the particulate refractory component together. In other words, an inorganic binder can act as a temporary binder characterized as a low melting fluxing material which aids in maintaining the particulate refractory component together subsequent to organic burnout under preheat conditions and until the spinel refractory bonding develops. Examples of inorganic binders suitable for use are boric acid, borax, colemanite, etc., and preferably boric acid. Generally, boric acid comprises by weight from about 0.5% to about 5% of the liner. In addition, upon heating boric acid is converted to $B_2O_3$ which advantageously promotes sintering of the MgO refractory grain for improving the hot strength of the preheatable liner.

In further keeping with the invention, as to the fibrous materials, the following is preferred but not limited thereto: inorganic fibrous materials such as rockwool, slag wool, glass wool, refractory aluminum silicate fibers, and especially slag wool; and organic fibrous materials such as cellulosic materials derived from paper, paper wood, sawdust, wood meal, synthetic organic fibers or the like, and particularly paper. These fibrous materials generally serve to reinforce the preheatable liners so that the liners are not damaged by any impact during the manufacturing, shipment and installation. Additionally, the fibrous materials serve to prevent the particulate refractory component from settling out of the slurry and to control porosity and permeability of the liner. Further, by the use of such a fibrous material, the resulting preheatable liners can become a porous board which has low bulk density, whereby the heatinsulating effect thereof is improved. As noted above, the fibrous material represents by weight of the liner from 0% to about 10% and preferably about 5%.

As to the incorporation of a thixotropic substance, it generally acts as a thickening agent or forming aid during preparation of the desired shape and generally comprises by weight of the liner from 0% to about 5%. Exemplary of thixotropic substances are bentonite, methylcellulose, alginates, etc., and especially bentonite. As to the bentonite, it is preferred that the calcium bentonite is employed as opposed to the sodium bentonite.

In accordance with the present invention, the preheatable molded refractory insulating liner structures are suitable for forming linings for casting vessels, such as hot tops, ladles, tundishes, troughs or pipes, etc., which are intended to contain molten ferrous alloy metals. The versatility of these structures enables them to be shaped, for example, into the form of a plurality of predetermined shaped inserts. Preferably, the preheatable liners of this invention are in the form of a plurality of shaped boards employed in tundishes.

As is conventional in the art of refractory insulating liners, manufacture can be readily done, for instance, by vacuum forming or injection molding methods which, for example, comprise forming an aqueous slurry of solids comprising a mixture containing a particulate refractory component, a binder therefore and, most preferably, a fibrous material component. Bentonite or other suitable thixotropic substances may also be employed as discussed above. Because of the copious amounts of water utilized in making the aqueous slurry, vacuum sources which are well-known in this art for removing substantial amounts of water are preferably employed. The raw batch of materials are suitably proportioned to provide the desired final mixture and preferably are intimately premixed in the slurry form prior to vacuum forming. After the preparation of a sufficient amount of a desired slurry, the material is usually poured into preformed molds of the desired shape and subjected to sufficient sub-atmospheric or vacuum conditions to suck away a substantial amount of the liquid in the slurry so that the formed shapes can be removed from the mold and dried. The wet vacuum formed shapes are passed through conventional hot air dryers to remove or evaporate virtually all the water and to heat the entire structure thickness to a suitable temperature for curing the organic and/or inorganic binder. The thickness of the liner when making a board may range, for instance, from about 3/4 of an inch to about 2 inches.

According therefor to a further feature of the present invention, there is provided a method of casting using a casting vessel which serves to transfer molten metals, such as ferrous alloys, comprising the steps of providing in the casting vessel a preheatable molded refractory insulating liner structure of this invention, heating the casting vessel to at least a vessel preheat temperature to initiate the development of hot strength in the preheatable liner structure for casting at metal casting temperatures and introducing a molten metal, such as a ferrous alloy, into the casting vessel.

EXAMPLE

The following represents two preferred compositions A and B for manufacturing a preheatable molded refractory insulating in accordance with this invention:

| Composition | Ingredient | % |
| --- | --- | --- |
| A | Phenol-formaldehyde resin | 2.30 |
|   | Hexamethylenetetraamine | 0.20 |
|   | Paper | 1.40 |
|   | Slag wool | 3.30 |
|   | Calcium bentonite | 1.60 |
|   | Magnesite: about 95% grade | 81.20 |
|   | Alumina | 10.00 |

-continued

| Composition | Ingredient | % |
|---|---|---|
| | | 100.00% |
| | Boric Acid 2.5% of dry batch weight. | |
| B | Phenol-formaldehyde resin | 2.30 |
| | Hexamethylenetetraamine | 0.20 |
| | Slag wool | 3.30 |
| | Paper | 1.40 |
| | Calcium bentonite | 1.60 |
| | Magnesite | 23.30 |
| | Alumina | 4.10 |
| | Zirconia | 63.80 |
| | | 100.00% |
| | Boric Acid 1.0% of dry batch weight. | |

TABLE I

Effect of Preheat and Contact with Molten Steel on the Porosity of the Tunidsh Board Manufactured with Composition A Disclosed in the Example

| | POROSITY | SPECIFIC GRAVITY |
|---|---|---|
| PREHEAT | | |
| Prior to preheat | 52.06% | 3.31 |
| After 1 hour 2300° F. preheat | 55.52% | 3.51 g/cc |
| AFTER CASTING | | |
| Sample - 18 inches under metal line 5 heats - medium carbon, high manganese steel | | |
| Hot Face - (¾-1.0" thick) | 21.32% | 3.53 g/cc |
| Cold Face - (½-¾" thick) | 47.01% | 3.55 g/cc |
| GUNNABLE TUNDISH COATING | | |
| After 1 heat sample uniform throughout 1" thick coating | 34.6% | 3.40 g/cc |

Preheat increased porosity by 6.6% by burning out organic binders and sintering and reacting to form spinel. Some of the porosity gain due to organic material is partially offset by the volume gain of the MgO and Al$_2$O$_3$ when they react to form MgAl$_2$O$_4$ which has a lower specific gravity than the reactants.

Table I shows that after contact with a molten ferrous alloy, the preheatable tundish board formed a dense (approximately 20% porosity), impermeable 0.5 inch thick layer in contact with the steel. The porosity on the cold side of the board remained high at 47.0%. The dense hot face contained some closed pores and some oxide contamination which lowered the apparent specific gravity compared to the cold face and the preheated specific gravities.

X-ray diffraction showed that alumina and MgO refractory grain was consumed, and that spinel was formed at tundish preheat conditions and spinel was found present in the hot face and the cold face of the tundish boards after casting ferrous alloys.

In use, the dense board hot face which developed resisted and reduced erosion and steel contamination. The high porosity on the back of the board advantageously gave lower thermal conductivity through the board, thus, lower temperatures at the permanent lining and less heat loss from the vessel resulted. Such boards had low erosion with high manganese steels, low hydrogen contribution to the steel and were preheated to about 2300° F. for up to about seven hours without adversely affecting their hot strength during casting.

The gunnable coating referred to in Table I had an intermediate (34%) porosity through its entire thickness. It failed to develop a dense layer at the hot face.

It was observed that the preheatable tundish boards developed sufficient hot strength and remained substantially rigid and intact during the vessel preheat temperatures and metal casting temperatures.

The present invention may, of course, be carried out in other specific ways than those herein set forth without departing from the spirit and essential characteristics of the invention. The present embodiments are, therefore, to be considered in all respects as illustrative and not restrictive and any changes coming within the meaning and equivalency range of the appended claims are to be embraced therein.

What is claimed is:

1. A preheatable molded refractory insulating liner structure prior to preheating of predetermined shape having insulating porosity for a metal casting vessel suitable for developing sufficient hot strength to maintain the integrity of the structure at vessel preheat and molten metal casting temperatures which are in the range of about 1900° F. to about 3000° F. comprising a molded uniform mixture having a substantial insulating porosity on the order of about 50% prior to preheating containing a particulate refractory component in an amount of about 75% to about 98.5% by weight of said preheatable liner structure of a mixture of alumina and MgO refractory grain wherein said alumina and MgO refractory grain are in a ratio of about 1:1 to about 1:94, respectively, and a binder for said component and inorganic fibrous material in sufficient amounts to maintain the predetermined shape of insulating porosity at least prior to the preheat temperatures wherein said alumina and MgO refractory grain are of a particle size in said preheatable liner structure to facilitate the formation of spinel bonding which results in increased hot strength with substantial maintenance of insulating porosity and shape without substantial shrinkage at both the vessel preheat temperatures of about 1900° F. to about 2400° F. and higher metal casting temperatures when said preheatable liner structure is used in a casting vessel heated for a sufficient period of time.

2. A preheatable insulating liner structure of claim 1 wherein said vessel is selected from the class consisting of a hot top, ladle, tundish, pipe or trough.

3. A preheatable insulating liner structure of claim 1 wherein said liner structure is in the form of a plurality of shaped inserts.

4. A preheatable insulating liner structure of claim 1 wherein said liner structure is a tundish board.

5. A preheatable insulating liner structure of claim 1 wherein said molten metal is a ferrous alloy.

6. A preheatable insulating liner structure of claim 5 wherein said ferrous alloy is a low hydrogen grade of steel.

7. A preheatable insulating liner structure of claim 1 wherein said MgO refractory grain is derived from the class consisting of magnesite, periclase or mixtures thereof.

8. A preheatable insulating liner structure of claim 1 wherein said binder component is selected from the class consisting of an inorganic or organic binder or mixtures thereof.

9. A preheatable insulating liner structure of claim 8 wherein said organic binder is selected from the class consisting of urea-formaldehyde resin or phenolformaldehyde resin or starch or mixtures thereof.

10. A preheatable insulating liner structure of claim 8 wherein said inorganic binder is boric acid.

11. A preheatable insulating liner structure of claim 1 further comprising an organic fibrous material.

12. A preheatable insulating liner structure of claim 1 wherein said inorganic fibrous material is slag wool or alumina silicate.

13. A preheatable insulating liner structure of claim 11 wherein said organic fibrous material is a cellulose fiber.

14. A preheatable insulating liner structure of claim 1 wherein said alumina is about 5% to about 15% by weight of said liner structure.

15. A preheatable insulating liner structure of claim 1 wherein said alumina is about 10% by weight and said MgO refractory grain is about 80% by weight of said liner structure wherein said MgO refractory grain is derived from about 95% MgO magnesite.

16. A preheatable insulating liner structure of claim 1 wherein said liner structure comprises about 75% to about 98.5% weight said particulate refractory component, 1% to about 10% fibrous material, about 1.5% to about 15% said binder component and 0% to about 5% a thixotropic substance.

17. A preheatable insulating liner structure of claim 1 comprising by weight:

| | | |
|---|---|---|
| (a) | phenol-formaldehyde resin: | about 2.3% |
| | hexamethylenetetraamine | about 0.2% |
| | slag wool: | about 3.3% |
| | paper: | about 1.4% |
| | bentonite: | about 1.6% |
| | magnesite - about 95% MgO: | about 81.2% |
| | alumina: | about 10%; and |
| (b) | boric acid: | about 2.5% of dry weight of (a). |

18. A preheatable insulating liner structure of claim 1 wherein said particulate refractory component further contains a suitable refractory filler in an acceptable amount.

19. A preheatable insulating liner structure of claim 18 wherein said refractory filldr is selected from the class consisting of spinel, zirconia or alumina wherein said fillers are in an amount by weight of said liner structure as follows:

| | |
|---|---|
| spinel | 0% to about 70%; |
| zirconia | 0% to about 80%; or |
| alumina | 0% to about 80%. |

20. A preheatable insulating liner structure of claim 19 comprising by weight:

| | | |
|---|---|---|
| (a) | phenol-formaldehyde resin: | about 2.3% |
| | hexamethylenetetraamine | about 0.2% |
| | slag wool: | about 3.3% |
| | paper: | about 1.4% |
| | bentonite: | about 1.6% |
| | magnesite: | about 23.3% |
| | alumina: | about 4.1% |
| | Zirconia: | about 63.8%; and |
| (b) | boric acid: | about 2.5% of dry weight of (a). |

21. A preheatable insulating liner structure of claim 1 wherein said alumina comprises particles wherein about 95% of the alumina particles pass through a 325 mesh screen and said MgO refractory grain comprises particles wherein no more than about 40% of the MgO refractory grain particles are retained on a 50 mesh screen or pass through a 325 mesh screen.

* * * * *